Patented Dec. 21, 1937

2,103,007

UNITED STATES PATENT OFFICE 2,103,007

LUSTROUS PIGMENT AND METHOD OF MANUFACTURING AND USING IT

Heinz Hunsdiecker, Cologne-Lindenthal, Germany

No Drawing. Application May 5, 1934, Serial No. 724,222. In Germany August 22, 1933

4 Claims. (Cl. 134—67)

The inventor has discovered that lead phosphate of the formula $PbHPO_4$ can be used as a glistening or iridescent pigment (lustrous pigment), of course, together with cementing agents admixed thereto. Such a lead phosphate can be obtained in the form of a precipitate consisting of leaf-shaped crystals, if phosphoric acid is added to a hot solution of a lead salt. The crystals thus formed are large and not uniform in size, ranging from 0.1 mm. to 4 mm. in diameter. The glistening effect obtained with such a pigment is not uniform, as the coarse particles are individually noticed. A uniformly crystallized lead phosphate whose crystals are extremely fine and which, as lustrous pigment, renders a uniform effect, is obtained if the precipitation takes place not in a purely aqueous solution, but with additions of water-soluble organic compounds, especially liquid ones. A mixture of acids is generally of advantage, because the precipitation of lead phosphate is somewhat retarded by the acids, whereby precipitation of amorphous lead phosphate is prevented. The manner of action when working in an aqueous solution of an organic solvent is due obviously to an increase of the speed with which the crystalline nuclei are formed at the expense of the growth of the crystals, in consequence whereof many small crystals are formed instead of a few large ones.

The following examples will elucidate the process. The raw material for Examples 1 and 2 is a solution of 3.3 kg. of lead nitrate in 10 litres of distilled water (Solution 1).

*Example 1.*—2.4 litres of Solution 1 are mixed with 4.8 litres of distilled water and 24 litres of 95% alcohol. Then 2.6 litres of a solution prepared from 12 kg. of phosphoric acid (specific gravity 1.32) in 50 litres of 95% alcohol are added in a single pouring operation. The precipitate is easily brought into the desired form for further working by centrifuging and washing with water or alcohol, and is advantageously stored as an aqueous or alcoholic suspension.

*Example 2.*—To a mixture of 2 litres of Solution 1, 15 litres of distilled water and 20 litres of glacial acetic acid are added 2.2 litres of a solution made from 12 kg. of phosphoric acid (specific gravity 1.32) in 50 litres of glacial acetic acid, as in Example 1 in a single pouring operation and the precipitate further treated as before.

If other lead salts are used a similar method is used. For the following Examples 3 and 4, the raw material is a filtered solution of 3.8 kg. of lead acetate in 10 litres distilled water (Solution 2).

*Example 3.*—A mixture is made of 2 litres of Solution 2, 0.2 litre of 66% nitric acid, 10 litres of distilled water and 20 litres of 95% alcohol. To this is added in a single pouring operation 2.2 litres of a solution made from 12 kg. of phosphoric acid (specific gravity 1.32) in 50 litres of 95% alcohol. A fine crystalline glistening deposit of lead phosphate is obtained, whereas without the addition of nitric acid the deposit is so finely divided as to appear almost amorphous.

*Example 4.*—As in Example 3, to a mixture of 2 litres of Solution 2, 0.2 litre of 66% nitric acid, 10 litres of distilled water and 20 litres of isopropylalcohol, 2.2 litres of a solution made from 12 kg. of phosphoric acid (specific gravity 1.32) in 50 litres of isopropylalcohol are added in a single pouring operation, and the precipitate further treated as above described.

In Examples 3 and 4, in place of nitric acid, some other highly ionized acid that will not, of itself, precipitate lead salts, may be used. In place of the specified solvents, acetone, diacetone-alcohol, glycol-ethers of the formula $CH_2OH.CH_2OR$ where R is an organic alkyl radical for example methyl or ethyl and so forth can be used with similar results. The proportions of mixture can be varied within certain limits, but greater dilution and greater additions of water in general undesirably affect the fineness of subdivision of the lead phosphate. In other words, while the permissive range of concentration of the reacting solutions is very wide (the lead content, for example, of the two solutions combined, calculated as lead phosphate, having a permissive range of from 0.1 gram per liter to saturation), it is preferable to keep the proportions within the range of the examples given. In some cases it is advantageous to heat the reacting substances during operation.

The lead phosphate obtained by the described process is a product which glistens something like matt finished metal. It can be used alone as a paint pigment and as an addition to paints and lacquers of all kinds. In the manufacture of artificial substances and plastic masses such as pyroxylin, masses based on acetyl-cellulose and benzyl-cellulose, synthetic resins as, for example, phenol-formaldehyde resins, urea condensation products, casein and the like, a very good mother-of-pearl effect, far excelling that obtained with bronzes, can be obtained by the admixture of lead phosphate obtained by the present process during the preparation of the substance. The use of lead phosphate in synthetic resins, urea condensation products and artificial substances with a casein basis is only possible because lead phosphate has been found resistant to the hardening with formaldehyde.

Having now particularly described and ascertained the nature of my said invention and in what manner the same is to be performed, I declare that what I claim is:—

1. The process for the manufacture of a lustrous pigment, said process comprising the precipitation of lead phosphate as $PbHPO_4$ by reacting a solution of a lead salt with a solution of phosphoric acid in admixture with one of the group consisting of alcohol, acetic acid, acetone, diacetone alcohol, isopropyl alcohol and the glycol ethers, the permissive range of concentration of each reacting solution being from saturation to such relative concentration of each solution that the lead content of the two solutions combined, calculated as lead phosphate, will be at least 0.1 gram per litre.

2. The process for the manufacture of a lustrous pigment, said process comprising the precipitation of lead phosphate as $PbHPO_4$ by reacting in a single pouring operation a solution of a lead salt with a solution of phosphoric acid in admixture with one of the group consisting of alcohol, acetic acid, acetone, diacetone alcohol, isopropyl alcohol and the glycol ethers, the permissive range of concentration of each reacting solution being from saturation to such relative concentration of each solution that the lead content of the two solutions combined, calculated as lead phosphate, will be at least 0.1 gram per litre.

3. The process for the manufacture of a lustrous pigment, said process comprising the precipitation of lead phosphate by reacting a solution of a lead salt with a solution of phosphoric acid in admixture with a highly ionized acid which of itself will not precipitate lead salts and one of the group consisting of alcohol, acetic acid, acetone, diacetone alcohol, isopropyl alcohol, and the glycol ethers, the permissive range of concentration of each reacting solution being from saturation to such relative concentration of each solution that the lead content of the two solutions combined, calculated as lead phosphate, will be at least 0.1 gram per litre.

4. A crystalline form of $PbHPO_4$ consisting of unbroken crystals substantially uniform in size and less than 0.1 mm. in diameter and further characterized by an iridescent lustre producing effect similar to that of a pearl.

HEINZ HUNSDIECKER.